United States Patent
Kawanishi et al.

(10) Patent No.: US 9,231,638 B2
(45) Date of Patent: Jan. 5, 2016

(54) HIGH-SPEED COMMUNICATION CONTROL SYSTEM

(71) Applicant: National Institute of Information and Communications Technology, Koganei-shi, Tokyo (JP)

(72) Inventors: Tetsuya Kawanishi, Tokyo (JP); Atsushi Kanno, Tokyo (JP)

(73) Assignee: National Institute Of Information And Communications Technology, Tokyo (JP)

( * ) Notice: Subject to any disclaimer, the term of this patent is extended or adjusted under 35 U.S.C. 154(b) by 234 days.

(21) Appl. No.: 14/035,471

(22) Filed: Sep. 24, 2013

(65) Prior Publication Data

US 2014/0086588 A1    Mar. 27, 2014

(30) Foreign Application Priority Data

Sep. 24, 2012   (JP) ................................. 2012-209903

(51) Int. Cl.
   *H04B 10/25* (2013.01)
   *H04B 1/3827* (2015.01)
   *H04B 10/118* (2013.01)

(52) U.S. Cl.
   CPC ............ *H04B 1/3827* (2013.01); *H04B 10/118* (2013.01); *H04B 10/25* (2013.01)

(58) Field of Classification Search
   CPC ....................................................... H04B 10/25
   See application file for complete search history.

(56) References Cited

U.S. PATENT DOCUMENTS

| | | | |
|---|---|---|---|
| 2009/0084297 A1* | 4/2009 | Choi et al. | 114/56.1 |
| 2010/0039984 A1* | 2/2010 | Brownrigg | 370/316 |
| 2010/0150023 A1* | 6/2010 | Witzel et al. | 370/254 |

FOREIGN PATENT DOCUMENTS

| | | |
|---|---|---|
| JP | 2005-506586 A1 | 3/2005 |
| JP | 2007-528536 A | 10/2007 |
| WO | 0217193 | 2/2002 |
| WO | 2005072453 | 8/2005 |

OTHER PUBLICATIONS

Takahide Sakamoto et al., 50-Gb/s 16 QAM by a quad-parallel Mach-Zehnder modulator, Optical Communication—Post-Deadline Papers 33rd European Conference and Exhibition of, Sep. 2007, Berlin, Germany.

(Continued)

*Primary Examiner* — Shi K Li
(74) *Attorney, Agent, or Firm* — Myers Wolin, LLC

(57) ABSTRACT

A high-speed communication control system is provided to resolve the problem of transmission delay, while a communication capacity is ensured.
A communication system includes a transmission station 13 and a reception station 15. A communication system 17 includes an optical fiber line 19 and a wireless path 21 that connect the transmission station 13 to the reception station 15 so that information is transmitted and received. The transmission station 13 includes a communication control unit 11 that controls a communication path. The reception station 15 is able to communicate with the transmission station 13. The communication control unit 11 controls whether the information is transmitted to the reception station 15 via one of the optical fiber line 19 and the wireless path 21.

4 Claims, 4 Drawing Sheets

(56) References Cited

OTHER PUBLICATIONS

Jun Sakaguchi et al., 19-core fiber transmission of 19x100x172-Gb/s SDM-WDM-PDM-QPSK signals at 305Tb/s, OFC/NFOEC Postdeadline Papers, Mar. 2012, Postdeadline Session III (PDP5C.1), Optical Society of America, Los Angeles, California, USA.

Transmode, Low Latency—How low can you go?, Whitepaper, Web <http://www.transmode.com/en/resource/whitepapers?task=document.download&id=108>, Sep. 2013.

John Jay, Low Signal Latency in Optical Fiber Networks, Mar. 2011, Corning Incorporated, Corning, New York, USA.

Mark Claypool et al., Latency and Player Actions in Online Games. Communications of the ACM, Nov. 2006, 40-45, vol. 49, No. 11, New York, New York, United States.

Unity Cable System Completed, Boosts Trans-Pacific Connectivity, KDDI Corporation. Web.<http://www.kddi.com/english/corporate/news_release/2010/0401/> Apr. 2010, USA.

Masao Kitano et al., Negative Group Delay and Superluminal Propagation: An Electronic Circuit Approach, IEEE Journal of Selected Topics in Quantum Electronics, Feb. 2003, 43-51, vol. 9, No. 1, IEEE Photonics Society, Piscataway, New Jersey, USA.

Stephen R. Pratt, et al., An Operational and Performance Overview of the Iridium Low Earth Orbit Satellite System, IEEE Communications Surveys, Web <http://www.comsoc.org/pubs/surveys>, Mar. 1999, USA.

N.V. Wheeler et al., Wide-bandwith, low loss, 19-cell hollow core photonic band gap fiber and its potential for low latency data transmission, OFC/NFOEC Postdeadline Papers, National Fiber Optic Engineers Conference, Mar. 2012, Postdeadline Session I (PDP5A.2), Los Angeles, California, United States.

David Schneider, Feature: The Microsecond Market—Sophisticated technology now drives global financial trading to extremes of time and space, IEEE Spectrum, Web <http://spectrum.ieee.org/computing/networks/the-microsecond-market>, Apr. 2012, USA.

Masahiko Udea et al., Consideration for QoS Realization in Cross Link Satellites Communication Systems, Joho Shori Gakkai Shinpojiumu Ronbunsh, 2001, 525-530, vol. 2001 No. 7, Japan.

\* cited by examiner

HIGH-SPEED COMMUNICATION CONTROL SYSTEM

CROSS-REFERENCE TO RELATED APPLICATIONS

This application claims priority to Japanese Application No. 2012-209903, filed on Sep. 24, 2012, the contents of which are hereby incorporated by reference.

TECHNICAL FIELD

The present invention relates to a high-speed communication control system. More specifically, the invention is used for a high-speed communication control system capable of replying to a fast communication request while ensuring communication capacity by using optical fiber communication together with low delay wireless communication.

BACKGROUND ART

An optical fiber communication system is known as a system that achieves a high-speed information communication. The optical fiber communication system connects a transmission station to a reception station using an optical fiber. The transmission capacity of the optical fiber communication system is large. However, in the optical fiber communication system, for example, transmission delay of about 1.5 times electromagnetic waves propagating in a free space occurs.

In the following non-patent Literature, there is a problem of transmission delay caused by an optical fiber communication system. For example, in security transaction, an ultra high-speed transaction is important. Therefore, in the optical fiber communication, transmission delay is a big problem. For example, when a transaction instruction is transmitted from Japan to a stock exchange or the like of Singapore, Europe, or US, relatively large transmission delay occurs due to a long transmission distance. For this reason, for example, when Japanese companies perform transaction in foreign security markets, the Japanese companies are at a great disadvantage than local companies.

CITATION LIST

Patent Literatures

Non-Patent Literature 1: Low Latency "How low can you go?" Low Latency Design, transmode, whitepaper

SUMMARY OF INVENTION

Technical Problem

An object of the invention is to provide a high-speed communication control system capable of resolving a problem of transmission delay, while ensuring communication capacity.

Solution to Problem

The invention is based on an idea that fast communication request can reply by using optical fiber communication together with low delay wireless communication.

A first aspect of the invention relates to a communication system capable of replying to a fast communication request by using optical fiber communication together with low delay wireless communication. The communication system includes a transmission station 13 and a reception station 15. The communication system 17 further includes an optical fiber line 19 and a wireless path 21 that connect the transmission station 13 to the reception station 15 so that information can be transmitted and received. The transmission station 13 includes a communication control unit 11 that controls a communication path. The reception station 15 is able to communicate with the transmission station 13.

The communication control unit 11 controls whether the information is transmitted to the reception station 15 via one of the optical fiber line 19 and the wireless path 21. For example, a control communication unit 20 of the transmission station 13 includes a control device such as a computer, and thus the control device determines a kind of information. According to the determined kind of information, the control communication unit 20 controls whether the information is transmitted to the reception station 15 via one of the optical fiber line 19 and the wireless path 21.

According to a preferred embodiment of the communication system of the first aspect, the wireless path 21 includes one or both of a low earth orbit satellite and an ionosphere propagation path.

According to a preferred embodiment of the communication system of the first aspect, the wireless path 21 includes a low earth orbit satellite, and on the assumption that h [m] is an altitude of the low earth orbit satellite from an earth's surface, L [m] is a propagation distance of the optical fiber line between the transmission station 13 and the reception station 15, and $R_e$ [m] is an average radius of the earth, a refractive index n of the optical fiber satisfies a following relation equation;

[Equation 1]

$$n > h\left(\frac{2}{L} + \frac{1}{R_e}\right) + 1,$$

According to a preferred embodiment of the communication system of the first aspect, the communication control unit 11 includes an input class determination unit 31 and a path storage unit 33. The input class determination unit 31 is an element that determines a kind of information input to the transmission station 13. On the other hand, the path storage unit 33 is an element that stores whether the information is transmitted to the reception station 15 via one of the optical fiber line 19 and the wireless path 21 according to the kind of information input to the input class determination unit 31.

Thus, the communication system can select an appropriate transmission path according to input information.

According to a preferred embodiment of the communication system of the first aspect, the communication control unit 11 further includes a threshold value storage unit 41, a threshold value determination unit 43, and a transaction interruption signal generation unit 45. The threshold value storage unit 41 is an element that stores a threshold value. The threshold value determination unit 43 is an element that determines whether a numerical value input to the transmission station 13 exceeds the threshold value. The transaction interruption signal generation unit 45 is an element that generates a transaction interruption signal when the threshold value determination unit 43 determines that the numerical value input to the transmission station 13 exceeds the threshold value. The communication control unit 11 performs control that transmitting the transaction interruption signal to the reception station 15 via the wireless path 21 when the transaction interruption signal is generated by the transaction interruption signal generation unit 45.

Thus, the communication system is able to interrupt transaction automatically and quickly, when a predetermined condition is satisfied.

Advantageous Effects of Invention

The invention can provide a high-speed communication control system capable of resolving a problem of transmission delay, while ensuring communication capacity.

DESCRIPTION OF EMBODIMENTS

Hereinafter, an embodiment of the invention will be described with reference to the drawings. The invention is not limited to the embodiment to be described below, but known elements may be added.

A first aspect of the invention relates to a communication system capable of replying to a fast communication request by using optical fiber communication together with low delay wireless communication. Examples of the communication system according to the invention include a communication system used for financial transaction, a communication system for online games, and a communication system for auction sites. For example, examples of the communication system used for financial transaction include a client computer with which a transmission station 13 performs financial transaction and a server computer with which a reception station 15 provides transaction information and performs transaction of financial products. In the communication system for online games, the transmission station 13 is a client computer operated by a user and the reception station 15 is a server computer that provides information regarding online games to each client computer.

Figure 1:
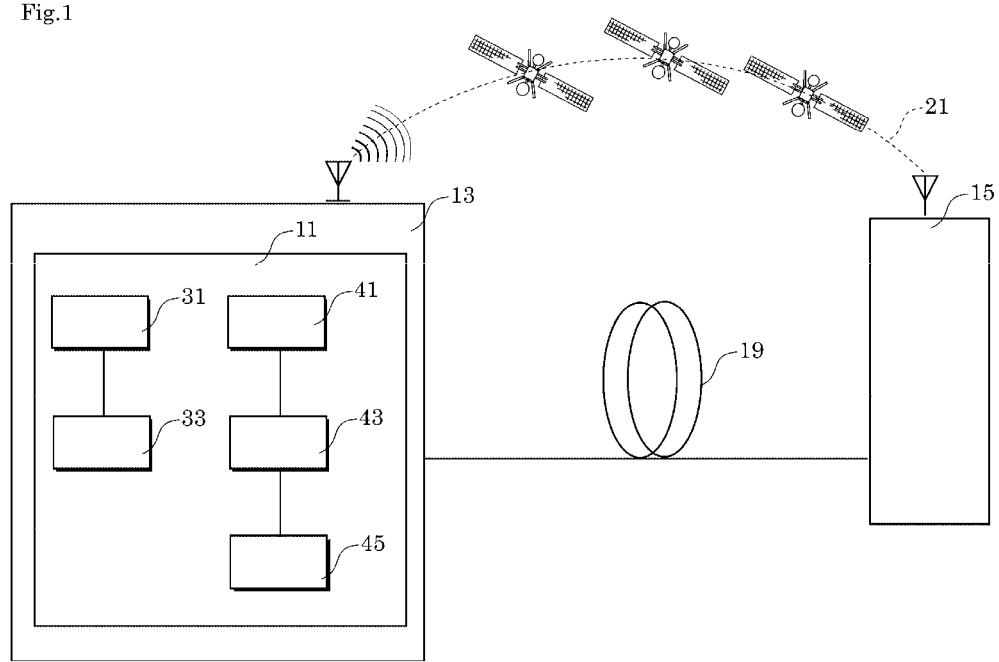
FIG. 1 is a block diagram illustrating a communication system according to the invention.

FIG. 1 is a block diagram illustrating a communication system according to the invention. As illustrated in FIG. 1, the communication system includes the transmission station 13 and the reception station 15. The communication system 17 includes an optical fiber line 19 and a wireless path 21 connecting the transmission station 13 to the reception station 15 so that information can be transmitted and received. The transmission station 13 includes a communication control unit 11 that controls a communication path. The reception station 15 can communicate with the transmission station 13.

The optical fiber line 19 is one or a plurality of optical fiber networks connecting the transmission station 13 to the reception station 15. The optical fiber line 19 may be configured halfway through relay of routers. The optical fiber line 19 and a communication system using an optical fiber line are known technologies. Accordingly, a known optical fiber line can be appropriately used as the optical fiber line 19 according to the invention. Further, a method of transmitting information using the optical fiber line 19 is also a known technology. Accordingly, in the invention, information can be transmitted and received between the transmission station 13 and the reception station 15 via the optical fiber line 19 using a known information transmission method.

The wireless path 21 is a path through which information is transmitted and received between the transmission station 13 and the reception station 15 using a wireless signal. A method of transmitting information using a wireless signal is a known technology. Accordingly, in the invention, a known wireless communication method can be appropriately used.

The communication control unit 11 controls whether the information is transmitted to the reception station 15 via one of the optical fiber line 19 and the wireless path 21. For example, a communication control unit 11 of the transmission station 13 includes a control device such as a computer, and thus the control device determines a kind of information. According to the determined kind of information, the communication control unit 11 controls whether information is transmitted to the reception station 15 via one of the optical fiber line 19 and the wireless path 21.

According to a preferred embodiment of the communication system of the first aspect, the wireless path 21 includes one or both of a low earth orbit satellite and an ionosphere propagation path.

The wireless path 21 including a low earth orbit satellite is a path through which the low earth orbit satellite relays wireless signals output from the transmission station 13 to the reception station 15 when one or a plurality of low earth orbit satellites are provided between the transmission station 13 and the reception station 15. An information transmission system using a plurality of low earth orbit satellites is disclosed in, for example, Japanese Patent Application Laid-Open (JP-A) No. 2002-185379.

A method of adjusting the altitude of a low earth orbit satellite is a known technology. The altitude of a low earth orbit satellite is preferably set in the following way. It is assumed that h [m] is an altitude of the low earth orbit satellite from an earth's surface, L [m] is a propagation distance of the optical fiber line between the transmission station 13 and the reception station 15, and $R_e$ [m] is an average radius of the earth. A refractive index n of an optical fiber preferably satisfies a following relation equation.

[Equation 2]

$$n > h\left(\frac{2}{L} + \frac{1}{R_e}\right) + 1,$$

The foregoing equation is an equation for a refractive index of an optical fiber. L and $R_e$ can be calculated as specific numerical values. Therefore, for example, when a refractive index of an optical fiber can be obtained, a value equal to or less than a preferable altitude of the low earth orbit satellite can be calculated from the foregoing inequality equation.

This value includes a value considerably less than a normal altitude of a low earth orbit satellite. An example of h may be equal to or less than 2000 km, may be equal to or less than 800 km, may be equal to or less than 500 km, or may be equal to or less than 200 km. On the other hand, when h is too small, the low earth orbit satellite does not function as a satellite. Therefore, h may be equal to or greater than 100 km, may be equal to or greater than 150 km, may be equal to or greater than 250 km, or may be equal to or greater than 350 km. The upper limit and the lower limit of h can be combined arbitrarily from, for example, the above-enumerated values. For example, L may be equal to or greater than 5000 km, may be equal to or greater than 8000 km, or may be equal to or greater than 10000 km. The upper limit of L is, for example, $\pi R_e$ (the radius of the earth), but any value may be used.

With regard to the ionosphere propagation path, the ionosphere is used as an propagation path of a radio wave, as disclosed in JP-A No. 2007-235290. The technology for using the ionosphere as a propagation path of a wireless signal is a known technology, as disclosed in the foregoing patent Literature. Accordingly, a known propagation path may be appropriately used as the ionosphere propagation path in the invention. Further, a technology for propagating a wireless signal using the ionosphere is already known, for example, in the technologies of the foregoing patent Literature and this Literature.

According to a preferred embodiment of the communication system of the first aspect, the communication control unit 11 includes an input class determination unit 31 and a path storage unit 33. The transmission station and the reception station included in the communication system preferably include a computer. The computer includes an input/output unit, a control unit, a calculation unit, and a storage unit. The respective elements are connected to each other so that information can be transmitted and received via a bus or the like. A main memory in the storage unit stores a control program. Therefore, when predetermined information is input from the input/output unit, the control unit receives an instruction from the control program stored in the storage unit, appropriately reads necessary information from the storage unit, and causes the calculation unit to perform predetermined calculation. The control unit appropriately stores a calculation result in the storage unit and outputs the calculation result from the input/output unit.

The input class determination unit 31 is an element that determines a kind of information input to the transmission station 13. The control unit, the calculation unit, and the control program stored in the storage unit of the computer function as, for example, the input class determination unit 31.

The path storage unit 33 is an element that stores whether information is transmitted to the reception station 15 via one of the optical fiber line 19 and the wireless path 21 according to the kind of information input to the input class determination unit 31. The storage unit of the computer functions as the path storage unit 33.

Thus, the communication system can select an appropriate transmission path according to the input information.

For example, a case of a communication system for financial products or a communication system for auction (including a communication system for auction in an online game) will be described. For example, it is not necessary to transmit and receive data such as stock price information, security names, information regarding GUI to display the stock price information and the security names so quickly. Accordingly, the path storage unit 33 stores information regarding static data displayed on the clients in association with an optical fiber line path. On the other hand, it is preferable to transmit information regarding purchase of security names or products displayed on the clients to the reception station 15 quickly. An information amount of the purchase information is not so large. Therefore, the purchase information can quickly propagate via the wireless path 21. Accordingly, the path storage unit 33 stores an unauthorized path in association with the purchase information. Further, information regarding purchase prices may be transmitted together with the purchase information or may be transmitted via the optical fiber line 19.

For example, information regarding a purchase order and a purchase price of a given product is input from an input device (a keyboard or the like) of a computer to the computer. Then, the control unit receives the information regarding the purchase order and the purchase price of the given product. The control unit determines a kind of the input information based on an instruction from the control program. When the purchase order and the purchase price are input to the computer, the purchase order and the purchase price are input to the computer together with the information (for example, a tag) indicating the purchase order and the purchase price of the given product. Therefore, the control unit determines the kind of the input information, by appropriately referring to the storage unit based on the information (for example, a tag). In this example, the computer determines that the input information is the purchase order information relevant to a given product and the purchase price information regarding the given product. On the other hand, for example, the purchase order is stored in the storage unit in association with a wireless path (short-range satellite path). Further, the purchase price is stored in the storage unit in association with the optical fiber line. Therefore, the control unit reads the information stored in the storage unit, and then determines the propagation path of the purchase order as the wireless path and the propagation path of the purchase price as the optical fiber line. The computer appropriately stores the result of the path determination by the control unit in the storage unit. The computer appropriately reads the result of the path determination from the storage unit and performs control such that the information is transmitted along the path determined by the control unit.

According to a preferred embodiment of the communication system of the first aspect, the communication control unit 11 further includes a threshold value storage unit 41, a threshold value determination unit 43, a transaction interruption signal generation unit 45.

The threshold value storage unit 41 is an element that stores a threshold value. The storage unit of the computer functions as the threshold value storage unit 41. A value requested appropriately in advance may be stored as the threshold value in the computer. An example of the threshold value is a use limit that is set by a user. The threshold value may be a use limit that is requested in real time based on an individual asset of the user or various factors. The threshold value may be a use limit of a given user per day. The threshold value may be a set value of a variation ($\Delta$ yen/$\Delta$ time) of the price of a product continuously desired to be purchased by the user. In regard to the set value of the variation, the threshold value of the variation may be set to 0, for example, when the price of the product of which a price is listed is viewed in a given time unit, the price is changed to a minus value, and thus the user desires to stop the purchase. There is no problem although the price of a given product falls to the degree which is a given degree of time interval. However, when the price falls to the degree exceeding the degree and the purchase of the product is desired to stop, the set value of the variation ($\Delta$ yen/$\Delta$ time) may be set to a given minus value.

The threshold value determination unit 43 is an element that determines whether a numerical value input to the transmission station 13 exceeds the threshold value. The control unit, the calculation unit, and the control program stored in the storage unit of the computer function as the threshold value determination unit 43. The numerical value input to the transmission station 13 may be an accumulated value of the numerical values input to the transmission station 13. The computer stores the above-described threshold value in the storage unit. The computer derives the value relevant to the above-described threshold value based on the input information. For example, when the use limit of that day is the threshold value, the computer accumulates purchase prices of a given user in the storage unit and updates the prices of the purchased products of that day whenever the user purchases the products. The computer calculates a sum of the updated use price of that day and the purchase prices of products which the user attempts to purchase and perform calculation to compare the sum price to the threshold value stored in the storage unit. When it is determined that the sum price is greater than the threshold value as the result, it is determined that the numerical value exceeds the threshold value. Thus, the computer derives a value according to a kind of threshold value, appropriately stores the value, and compares the value to the above-described threshold value. In this way, the threshold value determination unit 43 can determine whether the numerical value input to the transmission station 13 exceeds the threshold value.

The transaction interruption signal generation unit 45 is an element that generates a transaction interruption signal, when the threshold value determination unit 43 determines that the numerical value input to the transmission station 13 exceeds the threshold value. The control unit, the calculation unit, and the control program stored in the storage unit of the computer function as the transaction interruption signal generation unit 45. As described above, when the threshold value determination unit 43 determines that the numerical value input to the transmission station 13 exceeds the threshold value, for example, the transaction is required to be interrupted quickly. Therefore, the transaction interruption signal generation unit 45 receives the determination result indicating that the numerical value input to the transmission station 13 exceeds the threshold value and generates a transaction interruption signal to interrupt the transaction in the reception station.

When the transaction interruption signal generation unit 45 generates the transaction interruption signal, the communication control unit 11 performs control such that the transaction interruption signal is transmitted to the reception station 15 via the wireless path 21. Specifically, the transaction interruption signal is converted into a format of a wireless signal. Then, the wireless signal is transmitted to the reception station 15 from a transmission unit (for example, an antenna) that transmits a wireless signal. For example, since identification information regarding the reception station 15 is appended to the wireless signal, the transaction interruption signal arrives at the reception station appropriately via relay points. Thus, the communication system can interrupt the transaction automatically and quickly, when a predetermined condition is satisfied.

First Embodiment

High-Speed Data Transmission

In optical communication systems, a high-speed modulation or demodulation with advanced modulation formats plays an important role to achieve a high bit rate of all the optical channels. For example, dual polarization 16-level quadrature amplitude modulation (QAM) can provide a transmission speed of 100 Gb/s, when the modulation speed is 12.5 Gbaud [1].

Figure 2:
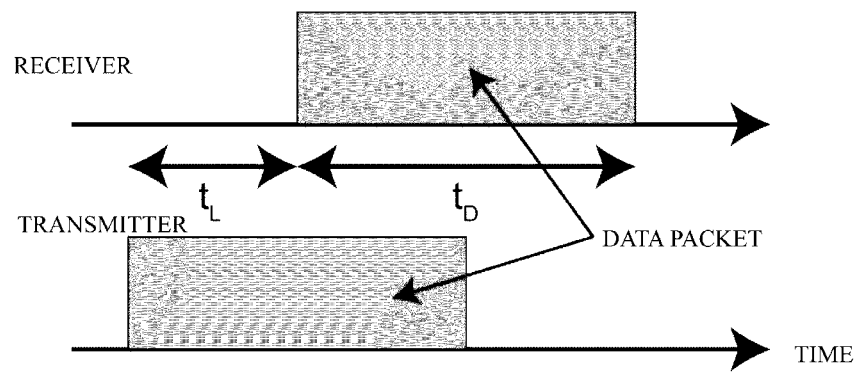
FIG. 2 is a diagram illustrating data packets of a time domain in a transmitter and a receiver.

An optical fiber can carry many channels by using wavelength domain multiplexing (WMD) and space domain multiplexing (SDM). A high-speed optical fiber transmission of which bit rate is over 300 Tb/s is recently demonstrated by using a multi-core fiber [2]. In this context, a "high speed" means a high transmission capacity. On the other hand, a high-speed signal propagation can reduce delay of response in transmission systems. The delay is called latency. FIG. 2 illustrates time domain data packets at a transmitter and at a receiver. The packet length in the time domain is given by $t_D = D/R$, where D [bit] is the size of the data and R is the bit rate. The latency $t_L$ is caused by delay due to signal processing at nodes, transmitters and receivers and signal propagation delay in fibers. The propagation delay due to finite speed of electromagnetic wave gives the absolute lower limit of latency in data transport systems. Thus, $t_L$ should be larger than $L/v_i$ where L is propagation length and $v_i$ is signal propagation speed. As described above, normally, a "high speed transmission" does not mean a high speed propagation of signals in transmission media. The total duration of data transmission given by $T = t_D + t_L$ decreases due to function of R and $v_i$, when $t_D$ is dominant in the duration. T can be largely reduced by increasing bit rate R indicating the transmission capacity. This is the reason why a high speed in transmission means a high capacity.

Figure 3:
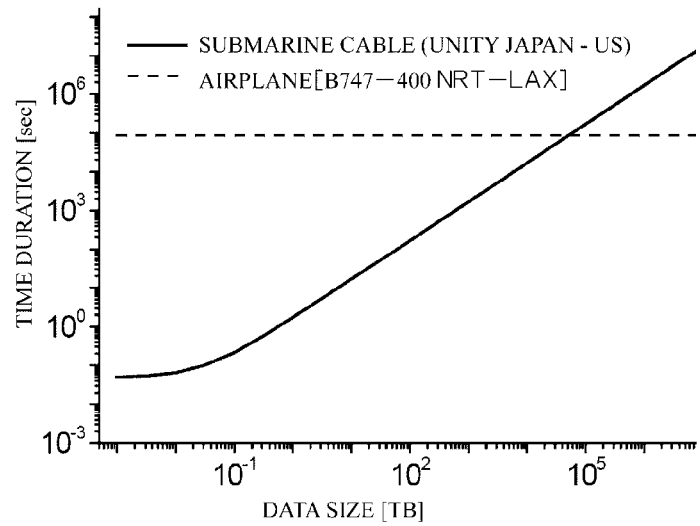
FIG. 3 is a diagram illustrating a time duration in data transmission using a submarine cable (Unity) or an air plane (B747-400) when delay in reaction of transmitters and receivers of a submarine cable system is neglected.

Optical fiber cables are commonly used for a long-haul high capacity transmission. For example, there is the high capacity transoceanic submarine cable called Unity, which connects Chikura in Japan and Los Angeles in USA. The total transmission capacity is 4.8 Tb/s. The distance between Chikura and Los Angeles is 9620 km. Thus, when it is assumed that light propagation speed in fibers is 67% of the speed of light (c), the propagation delay is 48.1 ms. The latency ($t_L$) is larger than this delay. When only bit rate is focused on, huge capacity data transmission can be achieved by physical transportation of storage media. As an example, in this Literature, digital data transmission capacity of an air cargo plane is estimated. It will be considered that amount of data in memory cards is carried by a B747-400 airplane flying between Tokyo Narita (NRT) and Los Angeles (LAX). Narita is very close to Chikura in the Tokyo metropolitan area. Time duration was assumed to be 24 hours including custom and other required processes at airports. The maximum effective payload of the airplane is 94 tons in weight. In addition, the volume of the payload should be smaller than 80 m$^3$. When the weight density of the payload is larger than 1175 g/cm$^3$, the effective payload is limited by weight. Here, it is assumed that 32-GB micro SD cards whose weight density is 2.42 g/cm$^3$ are used. The weight of one memory card is 0.4 g, so that the airplane can carry $2.35 \times 10^8 = (92 \times 10^3)/(0.4 \times 10^{-3})$ memory cards, which corresponds to 7.5 EB. When general load amount is 40%, the total transmission capacity is 500 Tb/s. The transmission capacity is much larger than in the submarine cable of Unity. However, the duration of air cargo is 24 hours, even though the data size is much smaller than 7.5 EB. When the definition of a "high speed" is a high capacity in transmission, the data transfer with air cargo should be a high speed. However, it is, of course, not feasible for typical applications of networks, such as teleconference, email, etc., because airplanes are much slower than lightwaves in fibers. FIG. 3 illustrates time duration of data transmission using the submarine cable (Unity) and the airplane (B747-400), where delay in reaction of transmitters and receivers of the submarine cable systems is neglected. Obviously, the duration is much smaller in the submarine cable than in the airplane, when the data size is not large. However, the duration in the submarine cable has the lower limit of 48.1 ms. This is due to lightwave propagation delay in fibers. When the data size is larger than 52 PB, the total time duration of the airplane would be smaller than in the cable. Thus, physical transportation of storage media is competitive for distribution of huge data, such as high definition movies.

For comparison of the both, energy consumption of the B747-400 and Unity are roughly estimated. $CO_2$ emission of the airplane is 350 tons for one way flight (average of westbound and eastbound between Narita and Los Angeles), while that of a typical submarine cable for 24 hours would be 0.27 tons for bidirectional transmission. The power consumption per b/s would be 23 times larger in air cargo than in submarine cable transmission. Thus, it is considered that optical fiber communications is more energy-efficient than physical transportation by air cargo. However, power consumption of nodes is dominant in network systems. This implies that the power consumption difference is smaller.

In addition to transmission capacity (or throughput) R, the latency is very important to describe digital data transmission systems, as discussed in this section. Lightwaves in optical fibers are fast enough for various applications, such as file transfer, email, etc. However, it is necessary to carefully design the latency in transmission systems for some particular applications. The speed of light in transmission media and low latency transmission systems will be described in the following sections.

Propagation Speed of Electromagnetic Wave

Figure 4:
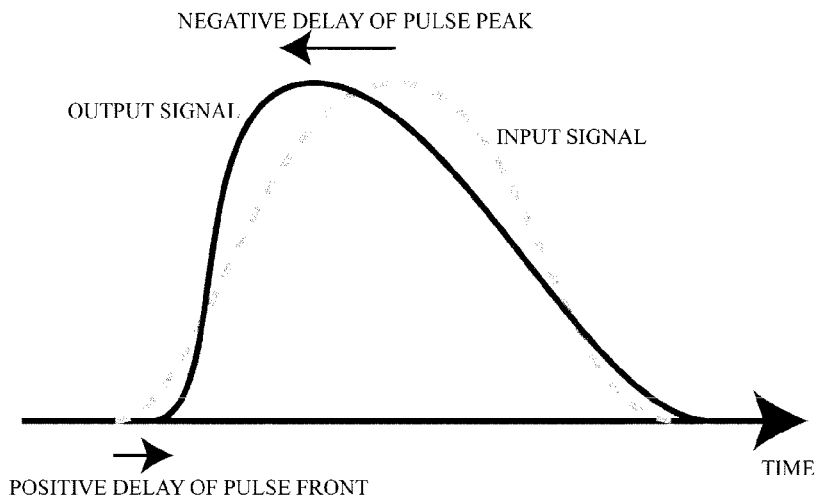
FIG. 4 is a diagram illustrating a profile of a time domain of an input signal and an output signal in a dispersive medium with negative group delay.

Propagation delay due to finite speed of electromagnetic wave gives the absolute lower limit of latency in data transport systems. As well known, the propagation speed of information over electromagnetic-wave ($v_i$) is smaller than the speed of light (c). Group velocity ($v_g$) describes propagation speed of wave packets and is smaller than c in many cases, while phase velocity ($v_p$) can be larger than c [7]. The group velocity ($v_g$) shows the propagation speed ($v_i$) of information in common data transmission systems. However, in dispersive transmission media with some particular conditions, $v_g$ can be larger than c [8]. Thus, $t_L$ can be smaller than L/c or 0. FIG. 4 is a diagram illustrating a profile of a time domain of input and output signals in a dispersive medium with negative group delay. As illustrated in FIG. 4, when $t_L$ is smaller than 0, peak of an output signal waveform precedes peak of an input signal waveform. In such cases, the causality does not have direct connection to $v_g$, so that $v_i$ is not equal to $v_g$. Speed of pulse front is called front velocity ($v_f$), which is normally smaller than c and is directly associated with the causality. In other words, $v_i$ is smaller than $v_f$. However, differences in these four velocities, $v_p$, $v_g$, $v_f$ and $v_i$, are not so large in transmission media commonly used for telecommunications. In optical fibers, $v_i$ can be approximately described by c/n, where n is effective refractive index. Thus, n is focused on in the following sections. Real part of n is larger than 1, when $v_g$<n.

In SMFs, n is about 1.5, but depends on a material and a waveguide structure. As described in Reference [4], the refractive indexes of commercially available SMFs have 0.5% differences. When the lowest index fiber in the reference instead of a conventional SMF is used for transoceanic cables, the delay difference is not negligible. In the submarine cable system of 9620 km, the difference is 260 µs, which corresponds to 26 Mbit of 100-Gb/s bit streams. The delay difference is large impact in some particular applications, such as a high-frequency trading. Recently, many types of optical fibers using fine structures have been reported to improve dispersion characteristics, transmission loss for wideband signals. PCFs have periodic structures in cladding, and can guide light along air cores. Signal propagation speed ($v_i$) in PCFs can be close to c. Thus, the latency due to propagation of the lightwave can be drastically reduced by using PCFs for data transmission. However, open issues still remain on fabrication of long PCFs, reduction of bending losses, and the like.

In free space transmission including FSO and radio wave wireless communications, $v_i$ is approximately equal to c, because the difference between n of air and n of vacuum is almost 0. In general, the total transmission capacity of OFC is larger than FSO, because of propagation loss and fluctuation in the air. OFC is also suitable for long-haul transmission, where optical amplifier can regenerate optical signals without using optical-to-electric or electric-to-optical conversion. On the other hand, the latency of FSO is much smaller than the latency of OFC, because $v_i$ in the air is 1.5 times $v_i$ in SMFs.

Latency in Satellite Communication System

As described above, the latency in FSO systems is smaller than that in OFC systems. Terrestrial FSO reduces the latency due to propagation delay, because the length of links in FSO is similar to or shorter than the length of links in OFC. Most of terrestrial FSO systems are designed for last one mile connection. In 4-km transmission, the latency of FSO is 13 µs, while the latency of OFC is 21 µs. The difference has impact on some particular applications, such as a high-frequency trading. Satellite communication is feasible for long-haul transmission. However, geostationary earth orbit (GEO) satellite communication is not suitable for latency sensitive applications, because the latency of transmission via GEO satellites is much larger than that of OFC using submarine cables. Here, the latency due to lightwave propagation in LEO satellite systems will be considered. The latency includes delays in ground-to-satellite, inter-satellite and satellite-to-ground links. As shown in Reference [9], the delays of ground-to-satellite link ($t_{L\ (uplink)}$) and that of satellite-to-ground link ($t_{L\ (downlink)}$) can be approximately given as follows.

[Equation 3]

$$t_{L(uplink)} \approx t_{L(downlink)} \approx \frac{h}{c}, \quad (1)$$

Figure 5:
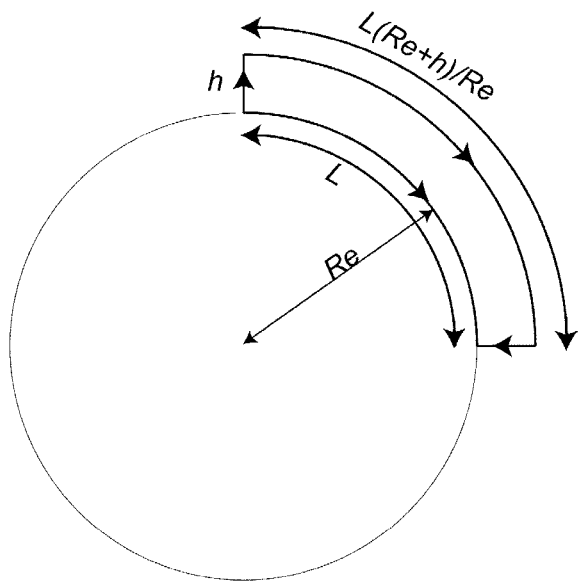
FIG. 5 is a diagram illustrating a concept of lightwave propagation paths of an LEO-based communication system and an OFC-based communication system.

Here, h is the satellite altitude. FIG. 5 is a diagram illustrating a concept of lightwave propagation paths of LEO and OFC based communication systems. As illustrated in FIG. 5, lightwaves connecting the satellites are assumed to propagate along a circular orbit with a radius of $R_e$+h, where $R_e$ is the radius of the earth, for simplicity. The delay of inter-satellite links can be expressed as follows.

[Equation 4]

$$T_{L(crosslink)} \approx \frac{L}{c}\left(\frac{R_e + h}{R_e}\right). \quad (2)$$

In actual LEO satellite communication systems, the propagation delay is larger than this, because the lightwaves propagating between the satellites have some walk-off from the circular orbit. When the number of the satellites and the transmission distance (L) are large enough, the walk-off is small. The total propagation delay can be described as follows.

[Equation 5]
$$t_{L(LEO)} = t_0 + \frac{h}{c}\left(2 + \frac{L}{R_e}\right), \quad (3)$$

Here, $t_0$ (=L/c) is the absolute lower limit of propagation speed. On the assumption that when n is a refractive index, the latency in OFC is expressed as follows.

[Equation 6]
$$t_{L(OFC)} = t_0 + (n-1)\frac{L}{c}. \quad (4)$$

When

[Equation 7]
$$n > h\left(\frac{2}{L} + \frac{1}{R_e}\right) + 1, \quad (5)$$

$t_{L(LEO)}$ can be smaller than $t_{L(OFC)}$. In addition, the signal sent via LEO satellites can precede the signal over fibers. Here, an effective refractive index of LEO is defined as follows.

$$n_{LEO} = h\left(\frac{2}{L} + \frac{1}{R_e}\right) + 1. \quad (6)$$

Figure 6:
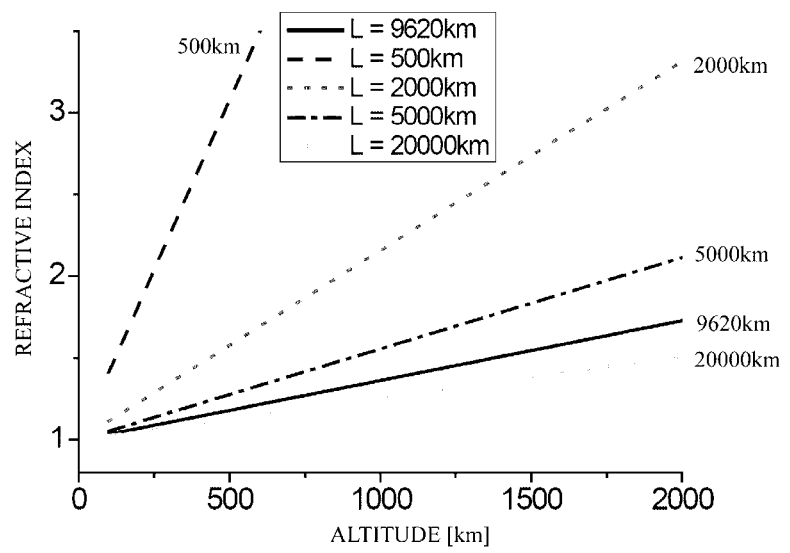
FIG. 6 is a diagram illustrating an effective refractive index of an LEO satellite system for various distances.
Figure 7:
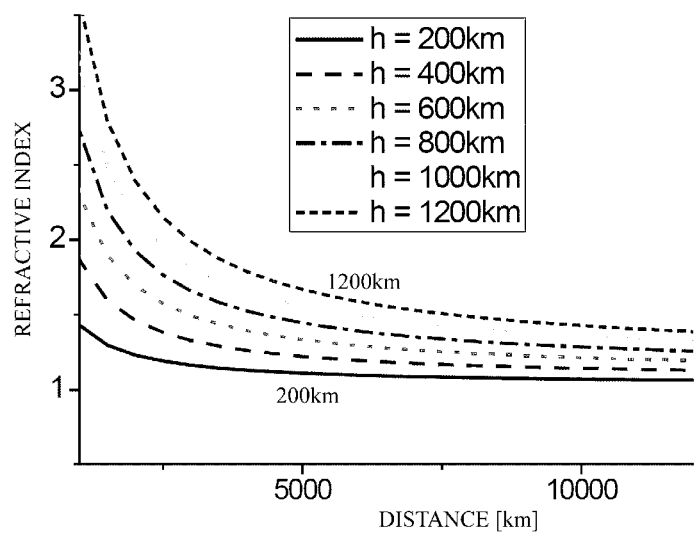
FIG. 7 is a diagram illustrating an effective refractive index of an LEO satellite system for various altitudes.
Figure 8:
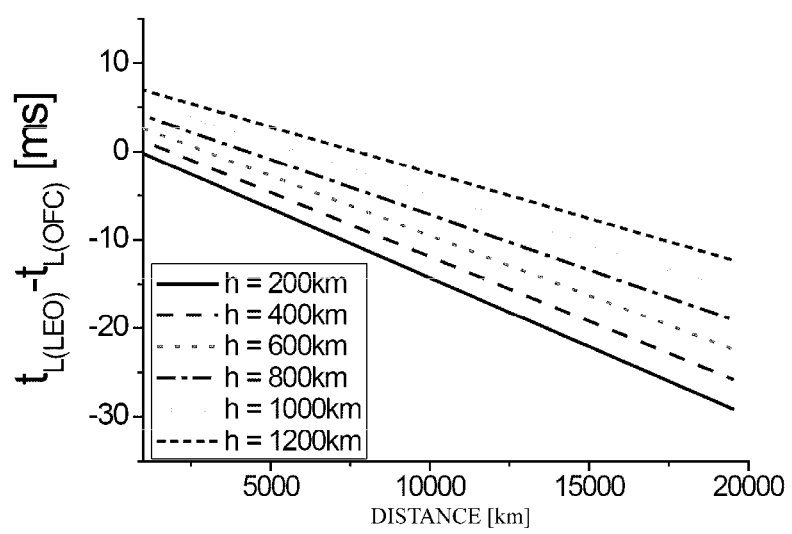
FIG. 8 is a diagram illustrating differences in delays of the LEO-based system and the OFC-based system.

$n_{LEO}^{-1}$ describes relative signal propagation speed in a LEO satellite system connecting two points on the ground. FIG. 6 illustrates the effective refractive index ($n_{LEO}$) for various distances L. When the altitude is equal to or smaller than 1370 km, $n_{LEO}$ for 9620-km transmission is smaller than n (=1.5) of SMF. As illustrated in FIG. 7, $n_{LEO}$ asymptotically goes to h/$R_e$+1. When h=600 km and L=20000 km, $t_{L(LEO)}$ is 77% of $t_{L(OFC)}$ ($n_{LEO}$=1.15). This implies that LEO satellite systems provide ultra low latency long-haul transmission. FIG. 8 illustrates differences in delays $t_{L(LEO)}$ and $t_{L(OFC)}$, calculated by using Equation (3) and Equation (4). The difference can be larger than 10 ms, which is much larger than that of OFC with low refractive index fibers. As mentioned above, the optical link has some additional delay due to the walk-off from the circular orbit. More detailed discussion on satellite constellations is necessary to calculate the propagation delay accurately.

Discussions

Low latency transmission is required in particular applications, such as data transfer for a high-frequency trading or online gaming. As discussed above, LEO satellite based transmission systems can reduce the latency. Radio waves reflected by the ionosphere also provide a high-speed signal propagation [10]. Wired transmission using PCFs is also a candidate for low latency communications. The refractive index of PCFs can be close to 1 [11]. However, expected transmission capacity of LEO satellites, radio waves or PCFs, is much smaller than in OFC using WDM and SDM. Availability of FSO or radio-wave wireless systems is an issue in mission-critical applications, such as a high-speed transmission for financial or banking businesses. To pursue total capacity and latency, combination of different types of transmission media has been considered. For example, some control signals are sent to receiver side via LEO satellites, while data for normal transactions can be sent by OFC. When rapid change of market is detected, the data for transaction already sent by OFC can be cancelled, because the control signal in the air can overpass the data in optical fiber cables.

REFERENCE LITERATURES

[1] T. Sakamoto, A. Chiba and T. Kawanishi, 50-Gb/s 16 QAM by a quadparallel Mach-Zehnder modulator, ECOC 2007 postdeadline paper
[2] J. Sakaguchi, B. J. Puttnam, W. Klaus, Y. Awaji, N. Wada, A. Kanno, T. Kawanishi, K. Imamura, H. Inaba, K. Mukasa, R. Sugizaki, T. Kobayashi and M. Watanabe, 19-core fiber transmission of 19×100×172-Gb/s SDM-WDM-PDM-QPSK signals at 305 Tb/s, OFC 2012 postdeadline paper
[3] Low Latency Design, transmode, whitepaper
[4] Low Signal Latency in Optical Fiber Network, Coring, whitepaper, WP8080
[5] M. Claypool and K. Claypool, "Latency and player actions in online games", Communications of the ACM, Vol. 49, pp. 40-4 (2006)
[6] Unity Cable System Completed, Boosts Trans-Pacific Connectivity, news release from KDDI (2010)
[7] L. Brillouin, Wave Propagation and Group Velocity. pp. 113-137, New York: Academic (1960)
[8] M. Kitano, T. Nakanishi, and K. Sugiyama, Negative Group Delay and Superluminal Propagation: An Electronic Circuit Approach, IEEE Journal of Selected Topics in Quantum Electronics, Vol. 9, pp. 43-51, (2003)
[9] S. R. Pratt, R. A. Raines, C. E. Fossa and M. A. Temple, An operational and performance overview of the IRIDIUM low earth orbit satellite system, IEEE Communications Surveys, pp. 2-10, Second Quarter 1999
[10] F. H. Raab, R. Caverly, R. Campbell, M. Eron, J. B. Hecht, A. Mediano, D. P. Myer and J. L. B. Walker, H F, VHF, and UHF Systems and Technology, IEEE Transactions on Microwave Theory and Techniques, Vol. 50, pp. 888-899 (2002)
[11] N. V. Wheeler, M. N. Petrovich, R. Slavik, N. Baddela, E. Numkam, J. R. Hayes, D. R. Gray, F. Poletti and D. J. Richardson, Wide-bandwidth, low-loss, 19-cell hollow core photonic band gap fiber and its potential for low latency data transmission, OFC 2012 postdeadline paper

INDUSTRIAL APPLICABILITY

The present invention can be used in a field of an optical communication device.

REFERENCE SIGNS LIST

11: Communication control unit
13: Transmission station
15: Reception station
17: Communication system
19: Optical fiber line
21: Wireless path
31: Input class determination unit
33: Path storage unit
41: Threshold value storage unit
43: Threshold value determination unit
45: Transaction interruption signal generation unit

The invention claimed is:

1. A communication system comprising:
   a transmission station that includes a communication control unit controlling a communication path;
   a reception station that is able to communicate with the transmission station;
   an optical fiber line that connects the transmission station to the reception station so that information is able to be transmitted and received; and
   a wireless path that connects the transmission station to the reception station so that information is able to be transmitted and received,
   wherein the communication control unit controls whether the information is transmitted to the reception station via one of the optical fiber line and the wireless path, and
   wherein the communication control unit further includes
       a threshold value storage unit that stores a threshold value,
       a threshold value determination unit that determines whether a numerical value input to the transmission station exceeds the threshold value, and
       a transaction interruption signal generation unit that generates a transaction interruption signal when the threshold value determination unit determines that the numerical value input to the transmission station exceeds the threshold value,
   wherein the communication control unit performs control that transmitting the transaction interruption signal to the reception station via the wireless path when the transaction interruption signal is generated by the transaction interruption signal generation unit.

2. The communication system according to claim 1, wherein the wireless path includes one or both of a low earth orbit satellite and an ionosphere propagation path.

3. The communication system according to claim 1,
   wherein the wireless path includes a low earth orbit satellite, and
   wherein on the assumption that h [m] is an altitude of the low earth orbit satellite from an earth's surface,
   L [m] is a propagation distance of the optical fiber line between the transmission station and the reception station, and
   $R_e$ [m] is an average radius of the earth,
   a refractive index n of the optical fiber satisfies a following relation equation;

[Equation 8]

$$n > h\left(\frac{2}{L} + \frac{1}{R_e}\right) + 1,.$$

4. The communication system according to claim 1, wherein the communication control unit includes
   an input class determination unit that determines a kind of information input to the transmission station, and
   a path storage unit that stores whether the information is transmitted to the reception station via one of the optical fiber line and the wireless path according to the kind of information input to the input class determination unit.

* * * * *